(12) United States Patent
Kishida (10) Patent No.: US 10,005,944 B2
(45) Date of Patent: Jun. 26, 2018

(54) POWER TRANSMISSION INCLUDING SILICA-COATED METAL PARTICLE

(75) Inventor: Masahiro Kishida, Fukuoka (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 1561 days.

(21) Appl. No.: 13/809,539

(22) PCT Filed: Aug. 16, 2012

(86) PCT No.: PCT/US2012/051055
§ 371 (c)(1),
(2), (4) Date: Jan. 10, 2013

(87) PCT Pub. No.: WO2014/028015
PCT Pub. Date: Feb. 20, 2014

(65) Prior Publication Data
US 2014/0048056 A1    Feb. 20, 2014

(51) Int. Cl.
| | |
|---|---|
| *F02C 3/20* | (2006.01) |
| *F02C 3/22* | (2006.01) |
| *F02C 3/32* | (2006.01) |
| *B32B 5/16* | (2006.01) |
| *C09K 5/16* | (2006.01) |
| *B22F 1/00* | (2006.01) |
| *B22F 1/02* | (2006.01) |
| *B82Y 40/00* | (2011.01) |
| *B82Y 30/00* | (2011.01) |

(52) U.S. Cl.
CPC .............. *C09K 5/16* (2013.01); *B22F 1/0018* (2013.01); *B22F 1/0096* (2013.01); *B22F 1/02* (2013.01); *B22F 2998/10* (2013.01); *B22F 2999/00* (2013.01); *B82Y 30/00* (2013.01); *B82Y 40/00* (2013.01); *Y10S 977/773* (2013.01); *Y10S 977/892* (2013.01)

(58) Field of Classification Search
CPC ............. H01M 4/8647; H01M 4/8657; H01M 4/9041; H01M 4/9075; H01M 4/925
USPC .......................... 428/403; 60/205, 208, 39.48
See application file for complete search history.

(56) References Cited

U.S. PATENT DOCUMENTS

| | | | |
|---|---|---|---|
| 4,086,958 A | 5/1978 | Lindner et al. | |
| 4,971,605 A | 11/1990 | Tarman | |
| 6,083,862 A | 7/2000 | Wheelock | |
| 6,913,825 B2 | 7/2005 | Ostafin et al. | |
| 2004/0105980 A1 | 6/2004 | Sudarshan et al. | |
| 2006/0070494 A1 | 4/2006 | Yoshii et al. | |
| 2006/0078682 A1 | 4/2006 | McDaniel et al. | |
| 2006/0164784 A1 | 7/2006 | Dong et al. | |
| 2007/0181906 A1 | 8/2007 | Chik et al. | |
| 2008/0085412 A1 | 4/2008 | Ortiz | |
| 2010/0212457 A1 | 8/2010 | Drnevich et al. | |

(Continued)

OTHER PUBLICATIONS

Chen et al., Enhanced thermal stability of silica-coated gold nanorods for photoacoustic imaging and image-guided therapy, Optics Expresss, Apr. 2010, vol. 18, No. 9, 8867-8878.*

Yu et al, Ultra-thin porous silica coated silver-platinum alloy nano-particle as a new catalyst precursor, Chem. comm., 2003, 1522-1523.*

(Continued)

*Primary Examiner* — Hoa (Holly) Le (57) ABSTRACT

Some embodiments provided herein relate to metal particles, methods of making, and methods of using such metal particles. In some embodiments, metal particles can be coated in silica and can be used as part of a power transmission system.

11 Claims, 5 Drawing Sheets

(56) References Cited

U.S. PATENT DOCUMENTS

| | | | |
|---|---|---|---|
| 2010/0248064 A1* | 9/2010 | la O' | H01M 8/2465 429/452 |
| 2011/0047988 A1* | 3/2011 | Lewis | B01D 53/945 60/295 |
| 2012/0129039 A1 | 5/2012 | Drenckhahan et al. | |
| 2014/0140909 A1* | 5/2014 | Qi | B01J 37/0228 423/212 |

OTHER PUBLICATIONS

Golunski, Why use Platinum in catalytic converters, Platinum Metals Rev., 2007, 51 (3), 162.*

Joo et al., Thermally stable Pt/mesoporous silica core-shell nanocatalysts for high-temperature reactions, Nature Mater., vol. 8, Feb. 2009.*

Lin et al., Probing Metal-support interactions under oxidizing and reducing conditions: In situ Raman and Infrared spectroscopic and scanning transmission electron microscopic-X-ray Energy-dispersive spectroscopic investigation of supported platinum catalysts, J. Phys. Chem. C 2008, 112, 5942-5951.*

Arnold, Batteries and Energy Storage, circa 2000 (discussing energy process known between 1700s to 1960s).*

Joo, S.H., et al., "Thermally stable Pt/mesoporous silica core-shell nanocatalysts for high-temperature reactions," Nature Materials, vol. 8, pp. 126-131 (Nov. 23, 2008).

International Search Report and Written Opinion received in International Application No. PCT/US2012/051055, filed on Aug. 16, 2012, dated Oct. 19, 2012.

Niitsoo et al., "Facile Synthesis of Silver Core—Siica Shell Composite Nanoparticles," Journal of Colloid and Interface Science, 2011, pp. 887-890, vol. 354(2).

\* cited by examiner

POWER TRANSMISSION INCLUDING SILICA-COATED METAL PARTICLE

CROSS-REFERENCE TO RELATED APPLICATION

This Application is the U.S. National Stage filing under 35 U.S.C. § 371 of International Application No. PCT/US2012/051055, filed on Aug. 16, 2012, the entire disclosure of which is hereby incorporated herein by reference.

FIELD

Embodiments herein generally relate to devices and methods for transmitting energy.

BACKGROUND

A variety of devices and methods exist for transmitting power from one point to another. Power can be transmitted in various forms, including, but no limited to, light, electricity, and heat.

SUMMARY

In some embodiments, a silica-coated metal particle is provided. The particle can include a metal core that has a diameter of about 0.5 nanometers to about 5,000,000 nanometers. The particle can include a coating over the metal core and the coating can include silica and have one or more pores that pass through the coating to the metal core. In some embodiments, the pore allows an oxidizing agent to contact the metal core. In some embodiments, the coating is about 0.2 nanometers to about 200 nanometers thick.

In some embodiments, a method of transmitting power is provided. The method can include providing a silica-coated metal particle that includes a metal core and a coating over the metal core. The method can include reducing the metal core, thereby accumulating heat by the particle and oxidizing the metal core, thereby generating heat from the particle.

In some embodiments, a method of manufacturing a silica-coated metal particle is provided. The method can include providing a metal core and coating the metal core in silica to form a silica-coated metal particle. In some embodiments, the coating includes silica. In some embodiments, the coating includes at least one pore that passes through the coating to the metal core, as described herein. The method can include drying the silica-coated metal particle. In some embodiments, the method includes baking the particle in a stream of gas. Thus, the method includes manufacturing a silica-coated metal particle.

In some embodiments, a power transmission device is provided. The power transmission device can include at least one silica-coated metal particle. The silica-coated metal particle can include a metal core and a coating over the metal core, wherein the coating includes silica and at least one pore that passes through the coating, to the metal core. The at least one pore is configured so as to allow an oxidizing agent to contact the metal core. The power transmission device includes a first chamber configured to allow reduction of the silica-coated metal particle. The power transmission device includes a second chamber configured to allow oxidation of the silica-coated metal particle. The power transmission device includes a passage fluidly connecting the first chamber to the second chamber. In some embodiments, the passage is configured to allow the at least one silica-coated metal particle to flow from the first chamber to the second chamber. The power transmission device includes an apparatus configured to receive heat produced by oxidation of the silica-coated metal particle in the second chamber.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In some embodiments, devices and methods for transmitting and/or storing power are provided. In some embodiments, the devices and/or methods can be employed for transmitting power, for example, in the form of heat, from a first location to a second location. In some embodiments, this can be achieved by the use of coated metal particles, which can be used to transmit heat from a first location to a second location. In some embodiments, the particles include a metal core and a coating over the metal core. In some embodiments, the coating includes silica. In some embodiments, the coating can be electrically conductive. In some embodiments, the coating has one or more pores that pass through the coating to the metal core and which permit an oxidizing or reducing agent to contact the metal core. In some embodiments, the coated particles allow for repeated cycles of oxidation and/or reduction without increasing the size and/or altering the surface chemistry of the particle to the extent that can occur when such events employ an uncoated particle. Thus, in some embodiments, the coating can provide a substrate for transmitting heat through, for example, reduction and/or oxidation processes, that can be used efficiently for repeated uses.

In some embodiments, the metal core can be reduced and such an endothermic reaction allows for heat to be gathered and/or stored in the particle. In some embodiments, at a later point in time, the metal core can then be oxidized, to provide heat from the particle (for example, via an exothermic reaction). In some embodiments, these processes can occur at a first and second location. For example, in some embodiments, the particle can be reduced in a first location, transferred to a section location, and then oxidized, thus providing heat to a device in the second location. While the present disclosure frequently discusses transferring heat and/or power, as will be appreciated by one of skill in the art, this need not be limited to the addition of heat to a particular location, and can also include removal of heat and/or power from a location. Similarly, any of the embodiments provided herein can also be employed without transporting the particles from a first to a second location. For example, the particles can absorb heat (for example, via an endothermic reaction), stay at the same location for a certain period of time, and then be subject to an exothermic reaction or simply release their energy at the same location, thereby serving as a heat and/or power storage device. Furthermore, in some embodiments, the system can be used as a heat sink, for example, in some embodiments, the particle can be reduced near an item that requires cooling, thus cooling the item. While these and other variations of these devices can be used for a variety of purposes, in some embodiments, a power transmission device is provided for providing heat in a second location and/or for cooling a first location, for example for use as a heater in a building or vehicle.

Figure 1:
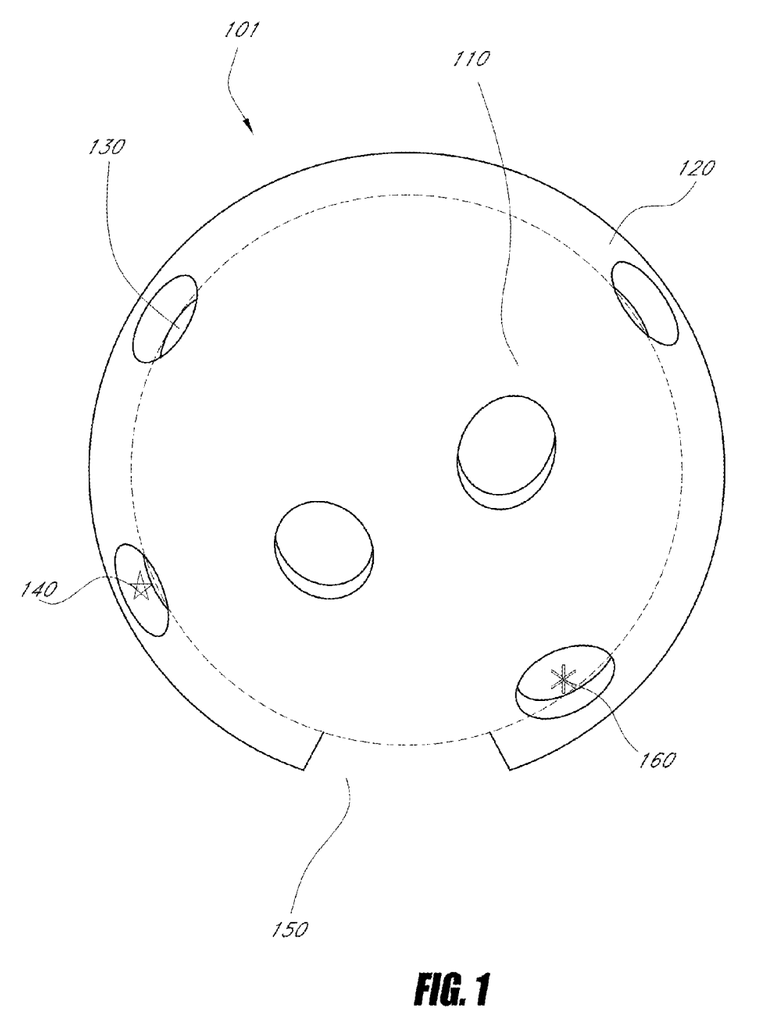
FIG. 1 is a drawing of some embodiments of a silica-coated metal particle.

In some embodiments, a coated metal particle is provided. In some embodiments, the particle includes a metal core. In some embodiments, the particle includes a coating over the metal core. In some embodiments, the coating includes silica. In some embodiments, the coating includes at least one pore. FIG. 1 is a drawing that illustrates some embodiments of a coated metal particle 101. In some embodiments, the particle includes a metal core 110. In some embodiments, the particle includes a coating 120 over the metal core 110. In some embodiments, the coating 120 includes at least one pore 130. In some embodiments, a portion of the surface of the metal core is uncoated 150, thus, the entire surface of the metal core need not be coated. However, as will be appreciated by one of skill in the art, the coating can provide some benefits, and thus, the degree of coating can correspond to the desired amount of protection provided by the coating.

In some embodiments, the coated particle is nano-scale. In some embodiments, the coated metal particle is micro-scale. In some embodiments, the diameter of the coated metal particle is about 1 nanometer to about 1,000,000 nanometers. In some embodiments, the diameter of the particle is at least about 0.2 nanometers, for example, at least about 0.2, 0.3, 0.5, 1, 2, 3, 5, 10, 15, 20, 30, 40, 50, 60, 70, 80, 90, 100, 110, 120, 150, 200, 250, 300, 350, 400, 500, 600, 700, 800, 900, 1,000, 1,100, 1,200, 1,500, 2,000, 2,500, 3,000, 4,000, 5,000, 7,000, 10,000, 20,000, 30,000, 40,000, 50,000, 70,000, 100,000, 150,000, 200,000, 300,000, 400,000, 500,000, 600,000, 700,000, 800,000, 900,000, 1,000,000, 1,100,000, 1,500,000, 2,000,000, 2,500,000, 3,000,000, 3,500,000, 4,000,000, 4,500,000, 4,800,000, or 5,00,000 nanometers, including any range defined between any two of the listed values.

In some embodiments, the metal core includes a metal or alloy that can be oxidized and reduced. In some embodiments, the metal core includes one or more of iron, magnesium, or calcium. In some embodiments, a surface of the metal core is in an oxidized state. In some embodiments, a surface of the metal core is in a reduced state.

In some embodiments, the diameter of the metal core is at least about 0.1 nanometers, for example at least about 0.5, 1, 2, 5, 10, 50, 90, 100, 110, 120, 150, 200, 250, 300, 500, 1,000, 1,500, 2,000, 3,000, 5,000, 10,000, 15,000, 20,000, 30,000, 50,000, 90,000, 100,000, 110,000, 150,000, 200,000, 300,000, 500,000, 800,000, 1,000,000, 1,500,000, 2,000,000, 2,500,000, 3,000,000, 3,500,000, 4,000,000, 4,500,000, 4,900,000, or 5,000,000 nanometers, including any range defined between any two of the listed values. In some embodiments, the diameter of the core is about 0.5 nanometers to about 5,000,000 nanometers. In some embodiments, the diameter of the core is about 100 nanometers to about 100,000 nanometers.

In some embodiments, there is a coating over at least a part of the metal core. In some embodiments, the outer surface of the metal core contacts the inner surface of the coating. In some embodiments, there is a headspace between the surface of the metal core and the coating. In some embodiments, the metal core contacts the coating via at least two points of contact, but there is a headspace between non-contacting surfaces of the metal core and the coating. In some embodiments, the coating includes at least one layer of silica. In some embodiments, the coating contains two or more layers of silica, for example 2, 3, 4, 5, 10, 20, 30, 40, 50 or more layers of silica. In some embodiments, the silica is crystalline. In some embodiments, the silica is amorphous. In some embodiments, the coating includes both crystalline and amorphous silica. In some embodiments, any metal oxide can be used, including those that do not include silica, as long as they have an insulating function.

In some embodiments, the coating has a substantially uniform thickness. In some embodiments, the uniformity of thickness is characterized by measuring the thickness of the coating at least about 10 dispersed points, and calculating the ratio of the standard deviation of thickness to the average thickness. In some embodiments, the ratio of standard deviation to average thickness is no more than about 40%, for example, no more than about 1%, 2%, 5%, 10%, 15%, 20%, 25%, 30%, 35%, or 40%. In other embodiments, the coating is substantially thicker in some areas than in others (for example, there need be no uniformity to the coating). In some embodiments, the average thickness of the coating is at least about 0.05 nanometers, for example about 0.05 nanometers, 0.1, 0.15, 0.2, 0.25, 0.3, 0.4, 0.5, 1, 1.5, 2, 2.5, 3, 4, 5, 6, 7, 8, 9, 10, 11, 12, 13, 15, 17, 20, 25, 30, 35, 40, 50, or 100 nanometers, including ranges between any two of the listed values. In some embodiments, the average thickness of the coating is about 0.2 nanometers to about 10 nanometers.

In some embodiments, the coating is thin relative to the whole coated particle. In some embodiments, the relative thickness of the coating can be described in terms of volume fraction of coating to volume of the coated particle. In some embodiments, the volume fraction of coating to the coated particle is no more than about 5% of the volume of the coated particle, for example about 0.1%, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.5, 3, 3.5, 4, 4.5, or 5% of the volume of the coated particle, including range defined between any two of the listed values. In some embodiments, the volume fraction of coating to the coated particle is no more than about 1% of the volume of the coated particle. In some embodiments, the coating includes silica.

In some embodiments, the coating prevents and/or reduces the metal core of a first coated metal particle from contacting the metal core of a second coated metal particle. For example, if two or more coated particles are in the same container, the coating prevents and/or reduces the likelihood that the cores of these particles will contact each other.

In some embodiments, the coating substantially prevents the metal core of a coated metal particle from growing, even after multiple cycles of oxidation and reduction. In some embodiments, after 10 cycles of oxidation and reduction, the metal core of a coated metal particle has grown by no more than about 5%, for example no more than about 10%. In some embodiments, when the core particles are small, they can gather (aggregate) after coating. When the core particles are relatively big, they can aggregate before the coating. Thus, the growth of particle can occur during the coating process.

In some embodiments, the coating contains at least one pore. In some embodiments the pore passes through the coating to the outer surface of the metal particle. In some embodiments, the diameter of the pore on the outer surface of the coating is substantially the same as the diameter on the inner surface of the coating. In some embodiments, the pore is substantially conical. In some embodiments, the pore allows a gaseous oxidizing or reducing agent to contact the surface of the metal particle. In some embodiments, the pore allows an electrode to contact the surface of the metal particle. In some embodiments, the pore includes an uncoated section of the metal particle. In some embodiments, the pore has a diameter of at least about 0.01 nanometers, for example at least about 0.01, 0.02, 0.03, 0.04, 0.05, 0.06, 0.07, 0.1, 0.15, 0.2, 0.3, 0.4, 0.5, 0.6, 0.7, 0.8, 0.9, 1, 1.1, 1.2, 1.3, 1.4, 1.5, 2, 2.5, 3.5, 4, 4.5, 5, 6, 7, 8, 9, 9.5, or 10 nanometers, including any range defined between any two of the listed values. In some embodiments, the pore has a diameter of about 0.05 nanometers to about 5 nanometers.

FIG. 1 illustrates a pore 130. In some embodiments, the pore is configured to allow an oxidizing agent 140 to contact the metal core 110. In some embodiments, the pore is configured to allow a reducing agent 160 to contact the metal core 110. In some embodiments, these can be the same pore or can be different pores.

In some embodiments, a fraction, but not all, of the coating includes pores as described herein. In some embodiments, the pores of the coating are of substantially the same diameter. In some embodiments, two or more pores of the coating have substantially different diameters. In some embodiments, the percentage of the coating that includes pores, calculated as the percent outer surface area of the coated particle that contains pores is at least about 0.01%, for example, about 0.01%, 0.05%, 0.08%, 0.1%, 0.15%, 0.2%, 0.3% 0.5%, 1%, 1.5%, 2%, 2.5%, 3%, 5%, 7%, 10%, 15%, 20%, 25%, 30%, 40%, 50%, 60%, 70%, 80%, 90%, or 95%, including ranges between any two of the listed values. In some embodiments, about 0.1% to about 99.9% of the coating includes pores. In some embodiments, about 0.1 to about 20% of the coating includes pores. In some embodiments, about 0.2 to about 2% of the coating includes pores. In some embodiments, the pores can be regular in shape. In some embodiments, the pores can be irregular in shape. In some embodiments, the pores can have a distribution of size and/or shape.

In some embodiments, the coated metal particle includes a metal core that has a diameter of about 0.5 nanometers to about 5,000,000 nanometers, and a coating over the metal core that includes silica and at least one pore. In some embodiments, the pore is configured to allow an oxidizing agent to contact the metal core. In some embodiments, the coating is about 0.2 nanometers to about 200 nanometers thick.

In some embodiments, a collection of coated metal particles is provided. In some embodiments, the coated metal particles can be any of the coated particles provided herein. In some embodiments, the collection includes particles of substantially the same core metal type, diameter, coating thickness, coating volume fraction, pore size, and/or pore fraction of the silica coating. In some embodiments, the collection includes two or more particles that differ with regard to at least one of: the core metal type, diameter, coating thickness, coating volume fraction, pore size, and/or pore fraction of the silica coating. In some embodiments, the collection can include coated particles having variations in any one or more of the above characteristics and/or other characteristics. In some embodiments, the sizes of the particles vary. In some embodiments, big and small particles are used in combination so that small particles can be interspaced among big particles. In some embodiments, there can be some be some interspace among iron particles. In some embodiments, as there is a coating, there need be no interspace because the particles. In some embodiments, the particles can vary in size from about 1 micrometer to about 0.1 micrometer.

In some embodiments, the volume and/or amount of the particles can be determined depending on a desired amount of heat for use. For example, an iron particle with 5 mm diameter can generate 4 KJ of heat, 400 KJ with 1 mol of iron.

In some embodiments, a fraction of the particles have metal cores on which a surface is in the oxidized state. In some embodiments, at least about 1% of the particles has a surface of the metal core that is in the reduced state, for example, at least about 1%, 2%, 5%, 10%, 20%, 30%, 40%, 50%, 60%, 70%, 80%, 90%, 95%, 97%, 99%, or 100% including any range between any two of the listed values or any range above any one of the listed values. In some embodiments, at least about 90% of the particles have a surface that is in the reduced state. In some embodiments, at least about 2% of the particles has a surface of the metal core that is in the oxidized state, for example, at least about 1%, 2%, 5%, 10%, 20%, 30%, 40%, 50%, 60%, 70%, 80%, 90%, 95%, 97%, 99%, 100% including ranges between any two of the listed values. In some embodiments, at least about 90% of the particles have a surface that is in the oxidized state.

In some embodiments, a method of transmitting power is provided. In some embodiments, the method includes providing a coated metal particle as described herein (for example, a silica-coated metal particle). In some embodiments, the method includes reducing the metal core of the coated metal particle, thus accumulating heat. In some embodiments, the method includes oxidizing the metal core of the coated metal particle, thus generating heat. In some embodiments, the particle can be moved between the reduction and oxidation events, thereby transmitting power from a first to a second location. In some embodiments, the particle need not be moved, and thus, power can be stored and transmitted or provided when needed at a later point in time.

Figure 2:
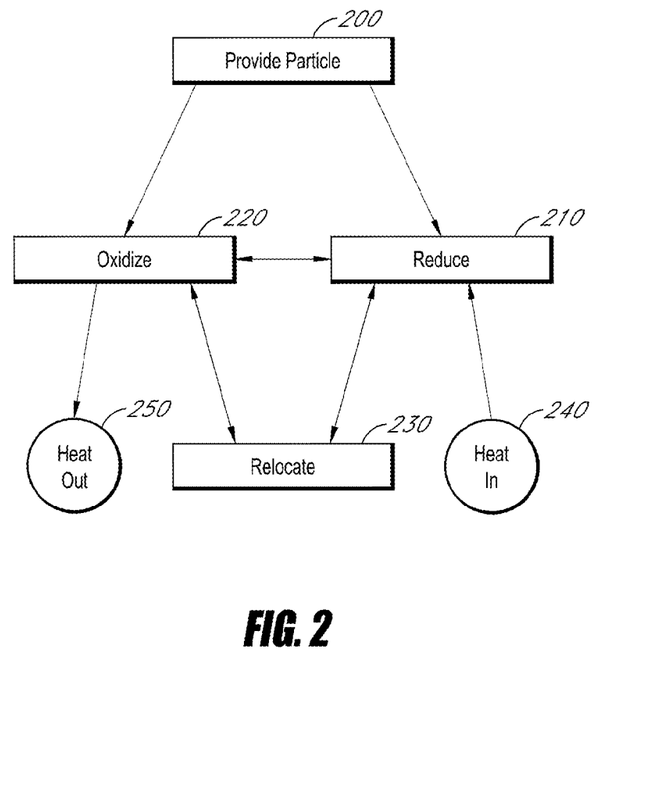
FIG. 2 is a flow chart depicting some embodiments for a method of transmitting power.

FIG. 2 is a flow chart depicting some embodiments of a method of transmitting power. In some embodiments, a coated particle is provided 200. In some embodiments, the coated particle is reduced 210. In some embodiments, the metal core is oxidized 220. In some embodiments, the particle is relocated 230 between the oxidation and/or reduction processes. In some embodiments, reducing the metal core accumulates heat in the particle 240. In some embodiments, oxidizing the metal core generates heat 250.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3:
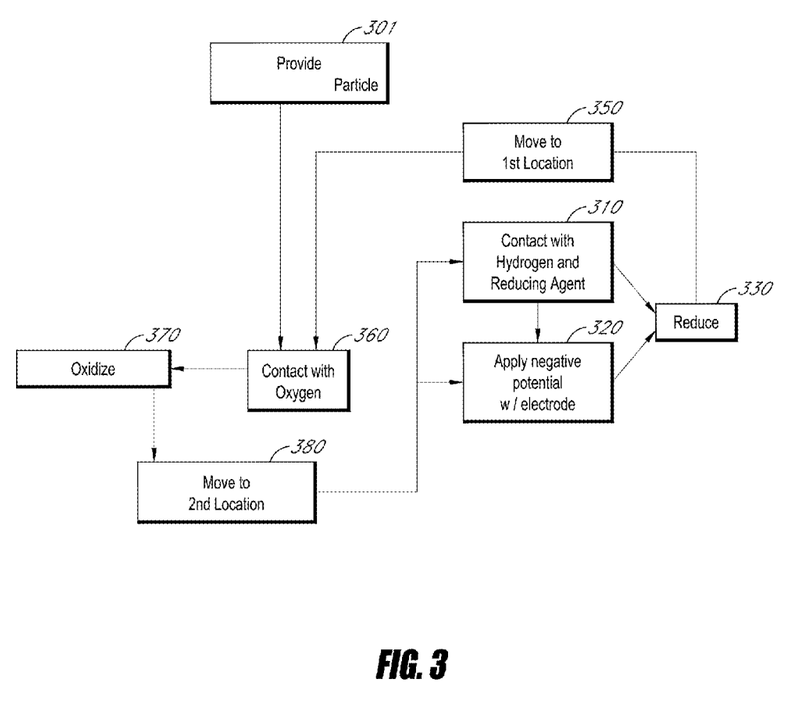
FIG. 3 is a flow chart depicting some embodiments of a method of transmitting power.

FIG. 3 is a flow chart depicting some embodiments of a method of transmitting power. In some embodiments, a particle is provided 301. In some embodiments, the particle is contacted with oxygen 360. In some embodiments, the particle is oxidized 370. In some embodiments, the particle is moved to a second location 380. In some embodiments, the particle is contacted with hydrogen and a reducing agent 310. In some embodiments, a negative potential is applied to the particle 320. In some embodiments, the particle is reduced 330. In some embodiments, the particle is moved to a first location 350. In some embodiments, the additional iterations of oxidation, reduction, and/or moving the particle are performed.

In some embodiments, the method of transmitting power includes moving the coated metal particle after it is oxidized and/or reduced. In some embodiments, the particle is moved from a first location to a second location. In some embodiments, the particle is moved from the second location to the first location. In some embodiments, the coated metal particle is oxidized at the first location, moved to the second location, and reduced at the second location. In some embodiments, the coated metal particle is reduced at the second location, moved to the first location, and oxidized at the first location. In some embodiments, the particle is moved to at least one additional location after being moved from the first location, but before arriving at the second location. In some embodiments, the particle is moved to at least one additional location after being moved from the second location, but before arriving at the first location. In some embodiments, the particle is oxidized and reduced in substantially the same location, and a device that requires heat is positioned near the particle at the time the particle is oxidized. Thus, in some embodiments, rather than moving the particles, the other devices and/or chambers and/or heat emitting/absorbing surfaces can be moved to the particles. In some embodiments, the particle is oxidized and reduced in substantially the same location, and a device that produces heat is positioned near the particle at the time the particle is reduced.

In some embodiments, the method of transmitting power, or parts of the method, is repeated. In some embodiments the method of transmitting power includes multiple cycles of oxidation and reduction. In some embodiments, two or more particles undergo cycles of reduction and oxidation. In some embodiments, two or more cycles of reduction and oxidation are performed on the same particle. In some embodiments, the method of transmitting power is repeated on the same coated metal particle. In some embodiments, at least two iterations of the method or a part of the method are performed, for example, 2, 3, 4, 5, 6, 7, 8, 9, 10, 11, 15, 20, 25, 30, 35, 40, 45, 50, 60, 70, 80, 90, 100, 110, 120, 150, 200, 250, 300, 350, 400, 450, 500, 600, 700, 800, 900, 1000, 1500, 2000, 2500, 3000, 3500, 4000, 4500, 5000, 10,000 iterations or more. In some embodiments, the iterations are performed at a frequency of at least about once every 2 minutes, 3, 4, 5, 6, 7, 8, 9, 10, 15, 20, 25, 30, 35, 40, 45, 50, 55, 60, 65, 70, 7, 80, 85, 90, 95, 100, 105, 110, or 115 minutes, or about once every 2 hours, 3, 4, 5, 6, 7, 8, 9, 10, 11, 12, 13, 14, 15, 16, 17, 18, 19, 20, 21, 22, or 23 hours, or about once every 1 day, 2, 3, 4, 5, 6, 7, 8, 9, 10, 15, 20, 25, or 30 days. In some embodiments, the diameter of the coated metal particle remains substantially constant after multiple cycles of use. In some embodiments, after 20 cycles of use, the diameter of the metal particle increased by no more than about 20%, for example 10, 11, 12, 13, 14, 15, 16, 17, 18, 19, or 20% compared to the diameter at the beginning of the first cycle of use.

In some embodiments, the diameter of the coated metal particle remains substantially constant after multiple cycles of use. In some embodiments, after 20 cycles of use, the diameter of the metal particle increased by no more than about 20%, for example 0.1%, 0.2, 0.5, 0.8, 1, 1.2, 1.5, 1.8, 2, 2.5, 3, 3.5, 4, 4.5, 5, 5.5, 6, 7, 8, 9, 10, 11, 12, 13, 14, 15, 16, 17, 18, 19, or 20% compared to the diameter at the beginning of the first cycle of use.

In some embodiments the method of transmitting power includes an oxidation process. In some embodiments, oxidation includes contacting the metal core with an oxidizing agent, for example oxygen. Generally, oxidation is an exothermic reaction, and thus results in the generation of heat.

In some embodiments the method of transmitting power includes a reduction process. In some embodiments, reduction includes contacting the metal core with a reducing agent, for example hydrogen gas, or sodium. In some embodiments, reduction includes contacting the metal core with an electrode, and applying a negative potential to the metal core. In some embodiments, the negative potential is at least about 0.1 volt, for example, about 0.1, 0.2, 0.3, 0.5, 0.9, 1, 1.1, 1.2, 1.5, 1.9, 2, 3, 4, 5, 10, 15, 20, 25, 30, 50 or 100 volts. In some embodiments, the negative potential is about 0.5 to about 20 volts. In some embodiments, the current applied to the metal core is one of AC or DC. Generally, reduction is an endothermic reaction, and thus results in the accumulation of heat.

In some embodiments, the method of transmitting power is performed within or near an item. In some embodiments, the item requires heating or cooling. In some embodiments, a first location of the manufactured item requires cooling, while a second location requires heat. In some embodiments, the manufactured item is one of a vehicle, a portable building, a computer server, or an electronically-readable medium. In some embodiments, the vehicle is one that does not have an internal combustion engine, or has an internal combustion engine that is not necessarily operating while the vehicle is operating, for example an electric vehicle, a hybrid-electric vehicle, or a fuel cell vehicle.

In some embodiments, the method of transmitting power includes providing a coated metal particle that includes a metal core. The particle includes a coating over the metal core, and the coating includes silica and at least one pore that passes through the coating to the metal core. The pore allows an oxidizing agent to contact the metal core. The metal core is reduced, thus accumulating heat. The metal core is oxidized, thus generating heat.

In some embodiments, a method of manufacturing a coated metal particle is provided. In some embodiment, the method includes providing a metal core. In some embodiments, the method includes coating the metal core. In some embodiments, the coating can be a silica coating. In some embodiments, the coating can be an insulating coating. In some embodiments, the method includes drying the coated core. In some embodiments, the method includes baking the coated core in a stream of gas. In some embodiments, a coated metal particle, as described herein, is thus formed.

Figure 4:
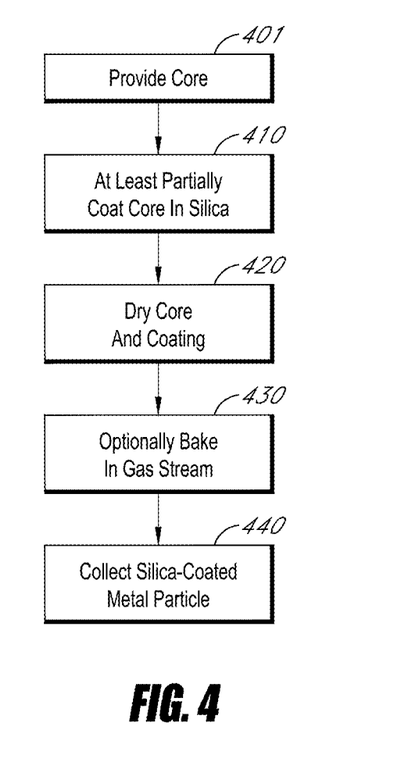
FIG. 4 is a flow chart depicting some embodiments of a method of manufacturing a silica-coated metal particle.

FIG. 4 is flow chart that depicts a method of manufacturing a silica-coated metal particle. In some embodiments, a core is provided 401. In some embodiments, the core is coated is at least partially coated in silica 410. In some embodiments, the coating is dried 420. Optionally, the particle is baked in a gas stream 430. In some embodiments, the silica-coated metal particle is collected 440.

In some embodiments, the metal core that can be provided is a metal salt particle. In some embodiments, the metal core is formed from a core precursor. In some embodiments, the core precursor includes a precursor of iron, magnesium, or calcium. Non-limiting examples of iron precursors include iron oxide, iron oxalate, iron acetate, iron carbonate, iron nitrate, iron sulphate, iron chloride, and/or other iron-containing compounds. In some embodiments, the core precursor is nano- to micro-scale. In some embodiments, the diameter of the core is as described herein. In some embodiments, a nano- to micro-scale core is formed by precipitating a metal compound from a reverse micelle solution or a colloid solution.

In some embodiments, the metal core is coated in silica and/or another coating. In some embodiments, the metal core is dispersed in a solution and a silica precursor is then added to the solution. In some embodiments, the silica precursor is a silicon alkoxide, for example, tetramethyl orthosilicate, tetraethyl orthosilicate, tetrabuthyl orthosilicate, methyl trimethyl silicate, and aminopropyl trimethyl silicate. In some embodiments, the silica coat includes a single layer of silica. In some embodiments, the silica coat includes two or more layers of silica. In some embodiments, the thickness of the silica core is as described herein. In some embodiments, the thickness of the silica core is controlled by controlling one or more of: the selection of silica precursor, the amount of silica precursor, the duration of the coating reaction, or conditions of the coating reaction such as temperature or pH of the solution. In some embodiments, the thickness of the silica coat, and/or the volume fraction of silica are as described herein. A silica-coated core can thereby be formed.

In some embodiments, the coated core is dried. In some embodiments, the coated core is removed from solution. In some embodiments, the solution surrounding the coated core is drained or aspirated away. In some embodiments, the coated core is dried under ambient temperature and pressure conditions. In some embodiments, the coated core is dried in a vacuum chamber. In some embodiments, the coated core is dried in an oven.

In some embodiments, the coated core is baked in a gas stream. In some embodiments, baking the coated core in the gas stream is optional. In some embodiments, the gas includes hydrogen. In some embodiments, the coated particle is baked at a temperature of at least about 200° C., for example at least about 200, 250, 290, 300, 310, 350, 400, 450, 500, 550, 600, 650, 690, 700, 710, 750, 790, 800, 810, 850, 890, 900, 950, 990, 1000, 1010, 1050, 1100, 1150, 1200, 1300, 1400, or 1500° C., including any ranges between any two of the listed values. In some embodiments the temperature is between about 300° C. and about 1000° C. In some embodiments, the combination of drying and baking steps produces pores as described herein.

In some embodiments, the coating is at least partially electrically conductive. In some embodiment, the coated core can have a silica coating that is baked in a gas stream that includes a hydrocarbon, and carbon is precipitated in the silica coating, thus endowing the silica coating with electrical conductivity. In some embodiments, the hydrocarbon includes a molecule of one, two, three, or greater than three carbon atoms, or a mixture of two or more of the listed molecules. In some embodiments, the gas stream includes a hydrocarbon and hydrogen. In some embodiments the molar ratio of hydrocarbon gas to hydrogen gas is at least about 1:0, 2:1, 3:1, 4:1, 5:1, 6:1, 7:1, 8:1, 9:1, 10:1, 15:1, 20:1, 25:1, 30:1, 50:1, 80:1, 100:1, 200:1, 300:1, 500:1, 900:1, 1000:1, 1100:1, 1500:1, 2000:1, 3000:1, 5000:1, 10000:1, 20000:1, or 50000:1, including ranges between any two of the listed values. In some embodiments, the silica-coated core is baked at a temperature of about 500° C. to about 800° C. in a gas stream that includes a hydrocarbon, thus endowing the silica layer with electrical conductivity. In some embodiments, various silicon alkoxides can be used to make the coating. Some examples are tetramethyl orthosilicate, tetraethyl orthosilicate, tetrabuthyl orthosilicate, methyl trimethyl silicate, and aminopropyl trimethyl silicate.

In some embodiments, the method of manufacturing includes coating the metal core to form a coated metal core. The coating can include silica. The coating includes at least one pore that passes through the coating to the metal core. The pore allows an oxidizing agent to contact the metal core. The coated metal particle is dried. The coated metal particle is optionally baked in a gas stream. The particle thereby formed includes at least one pore that passes through the coating to the metal core, in which the pore is configured to allow an oxidizing agent to contact the metal core. In some embodiments, the coating is electrically conductive, via the presence of hydrocarbons in the silica based coating.

In some embodiments, a power transmission device is provided. In some embodiments, the power transmission device includes at least one coated metal particle as described herein. In some embodiments, the power transmission device includes a first chamber configured to allow reduction of the coated metal particle. In some embodiments, the power transmission device includes a second chamber configured to allow oxidation of the coated metal particle. In some embodiments, the power transmission device includes a passage fluidly connecting the first chamber to the second chamber, and the passage allows coated metal particle to travel between the first chamber and the second chamber.

Figure 5:
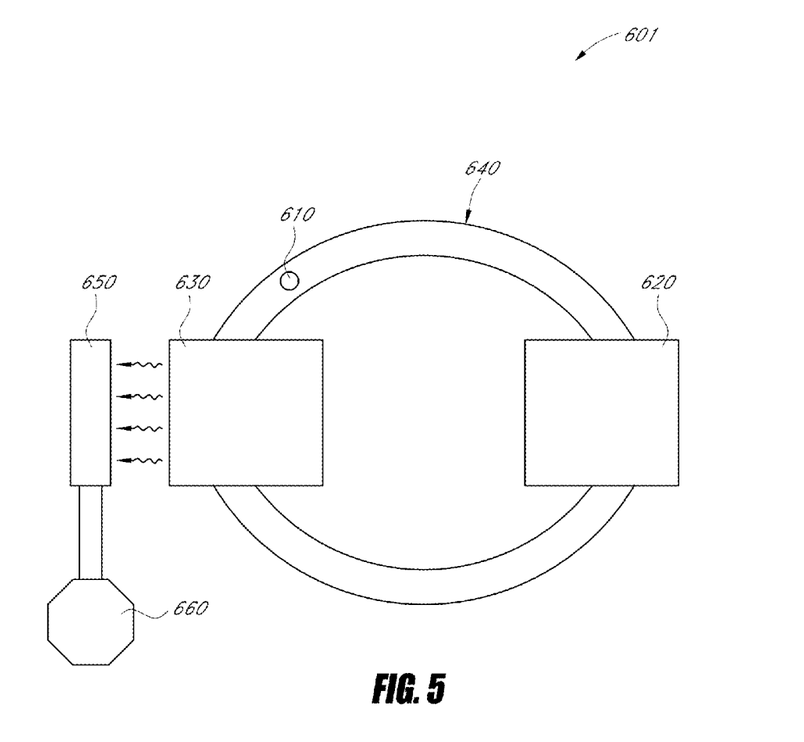
FIG. 5 is a drawing depicting a schematic illustrating a power transmission device.

FIG. 5 is a schematic representation of a power transmission device 601. In some embodiments, the device includes at least one coated metal particle 610. In some embodiments, the device includes a first chamber 620 configured to allow reduction of the coated metal particle. In some embodiments, the device includes a second chamber 630 configured to allow oxidation of the coated metal particle. In some embodiments, the device includes a passage 640, which connects the first chamber 620 and the second chamber 630, and allows the coated metal particle to travel between these two chambers. In some embodiments, the device includes a heat collection element 650. In some embodiments, the heat collection element 650 is connected to allow heat transfer to a radiator 660.

In some embodiments, the power transmission device includes one or more chambers. In some embodiments, each chamber is configured to hold the coated metal particles. In some embodiments, the chamber is configured to hold at least about 1 coated metal particles, for example at least about 1, $10^1$, $10^2$, $10^3$, $10^4$, $10^5$, $10^6$, $10^7$, $10^8$, $10^9$, $10^{10}$, $10^{11}$, $10^{12}$, $10^{13}$, $10^{14}$, $10^{15}$, $10^{16}$, $10^{17}$, $10^{18}$, $10^{19}$, $10^{20}$, $10^{21}$, $10^{22}$, $10^{23}$, $10^{24}$, $10^{25}$, $10^{26}$, $10^{27}$, $10^{28}$, $10^{29}$, or $10^{30}$ particles, including any range defined between any two of the listed values. In some embodiments, a chamber is substantially enclosed, for example a box, a cylinder, a pouch, or a bag. In some embodiments, the first chamber has at least one open face, for example a hopper or a channel. In some embodiments, the chamber includes a first opening for the entry of coated metal particles. In some embodiments, the first opening permits the entry of one coated metal particle at a time. In some embodiments, the first opening permits multiple coated metal particles to enter simultaneously. In some embodiments, the chamber includes a second opening for the release of coated metal particles. In some embodiments, the second opening permits the entry of one coated metal particle at a time. In some embodiments, the second opening permits multiple coated metal particles to enter simultaneously. In some embodiments, the chamber includes at least one valve to control the entry and/or release of coated metal particles.

In some embodiments, the first and/or second chamber is configured to allow reduction of the coated metal particle. In some embodiments, the chamber is configured for the simultaneous and/or concurrent reduction of substantially all of the coated metal particles in the chamber. In some embodiments, the chamber is configured for the simultaneous and/or concurrent reduction of at least about 10% of the coated metal particles it contains, for example, about 10%, 20%, 30%, 40%, 50%, 60%, 70%, 80%, 90%, 95%, or 99% o of the particles, including any range defined between any two of the listed values. In some embodiments the chamber includes an injector or spout for providing a gas or liquid reducing agent to the particles. In some embodiments, the chamber contains at least one electrode for electrically reducing the particles. In some embodiments, the chamber is configured for the electrode to directly contact a particle. In some embodiments, the chamber contains a conductive material, for example an aqueous salt solution that is in contact with the electrode so that the electrode can simultaneously reduce multiple particles. In some embodiments, the chamber contains a drain for evacuating the oxidizing agent or conductive material.

In some embodiments, the first and/or second chamber is configured to allow oxidation of the coated metal particle. In some embodiments, the second chamber is configured for the simultaneous and/or concurrent oxidation of at least about 10% of the coated metal particles it contains, for example, about 10%, 20%, 30%, 40%, 50%, 60%, 70%, 80%, 90%, 95%, or 99% o of the particles, including any range defined between any two of the listed values.

In some embodiments, the power transmission device includes additional chambers, for example at least one storage chamber for storing particles that have been oxidized or reduced. In some embodiments, coated metal particles are stored in a storage chamber after exiting the first chamber, but before arriving at the second chamber. In some embodiments, coated metal particles are stored in a storage chamber after exiting the second chamber, but before arriving at the first chamber.

In some embodiments, the power transmission device includes at least one passage fluidly connecting the first chamber to the second chamber. In some embodiments, the passage is one of a pipe, a channel, a tube, a hose, or a conduit. In some embodiments, the passage is sealed so that gas, liquid, or particles in the passage can only pass between the chambers and the passage. In some embodiments, the passage includes a device for moving the particles from the first chamber to the second chamber, for example a conveyor, a pump, a vacuum, a screw, or a roller. In some embodiments the passage is configured for the bidirectional movement of the coated metal particles, that is, the passage can move the particles from the first chamber to the second chamber, and also can move the particles from the second chamber to the first chamber.

In some embodiments, the power transmission device includes at least one passage, and can include two or more passages, that connect the first chamber to the second chamber. In some embodiments, the power transmission device includes a first passage for moving coated metal particles from the first chamber to the second chamber, and a second passage for moving silica coated metal particles from the second chamber to the first chamber. In some embodiments, the chambers can be part of the passage(s) and/or the passages can be part of the chambers. Thus, separate structures need not be employed in all embodiments.

In some embodiments, the power transmission device includes an apparatus configured to receive heat. In some embodiments, the apparatus is configured to receive heat produced by oxidation of the coated metal particles in the chamber (and/or passage). In some embodiments, the apparatus contacts a surface of the second chamber. In some embodiments, the apparatus includes a heating core that is inside of the second chamber. In some embodiments, the apparatus contacts a filament or network of filaments that contact second chamber. In some embodiments, the apparatus contacts a heat-conductive material, for example a liquid, gel, powder, or particulate solid that is circulated between the second chamber and the apparatus. In some embodiments, the apparatus does not contact the second chamber, core, filament, or heat-conductive material, but is positioned a distance therefrom. In some embodiments, the distance can be any distance as long as some desired amount of heat is transferred. In some embodiments, the distance is no more than about 0.1, 0.5, 1, 2, 5, 10, 20, 30, 50, 100, 150, 200, 300, 500, 1000, or 10,000 millimeters, including any range defined between any two of the noted values.

In some embodiments, a chamber is operationally connected to a device that employs heat or to a device that generates heat. In some embodiments, the operational connection is a physical connection, which includes a conductive material that contacts the second chamber and the device that requires heat. In some embodiments, the conductive material is one of a liquid, powder, or gel that is cycled between the second chamber and the device that requires heat. In some embodiments, the conductive material includes at least one of a metal or a carbon nanotube. In some embodiments, the operational connection is via a duct system, for example a radiator connected to an air duct, which contains an optional fan or blower.

In some embodiments, the second chamber is operationally connected to a device that that requires heat. In some embodiments, the device constantly requires heat. In some embodiments, the device only requires heat only from time to time. In some embodiments, the device requires at least about 0.001 joules, for example about 0.001 joule, 0.005, 0.01, 0.02, 0.05, 0.1, 0.15, 0.2, 0.3, 0.5, 1, 1.5, 2, 2.3, 3, 4, 5, 6, 7, 8, 9, 10, 20, 50, 100, 150, 200, 300, 500, 800, 1,000, 2,000, 3,000, 5,000, 10,000, 15,000, 20,000, 30,000, 50,000 or 100,000 joules per operation cycle, including any ranges between any two of the listed values.

In some embodiments, the device that requires heat is one of a radiator, a defroster, an engine block, a surface heater, a hydraulic system, a stove, a hot plate, and/or an auxiliary power supply.

In some embodiments, the first chamber is operationally connected to a device that generates heat. In some embodiments, the device that generates heat requires cooling. In some embodiments, the device that generates heat is an energy source. In some embodiments, the device generates at least about 0.001 joules, for example about 0.001 joule, 0.005, 0.01, 0.02, 0.05, 0.1, 0.15, 0.2, 0.3, 0.5, 1, 1.5, 2, 2.3, 3, 4, 5, 6, 7, 8, 9, 10, 20, 50, 100, 150, 200, 300, 500, 800, 1,000, 2,000, 3,000, 5,000, 10,000, 15,000, 20,000, 30,000, 50,000 or 100,000 joules per operation cycle, including any ranges between any two of the listed values. In some embodiments, an operation cycle lasts for at least about 0.1 second, for example, about 0.1 second, 0.5, 1, 1.5, 2, 3, 5, 10, 20, 30, 50, 100, 200, 300, 600, 1,000, 2,000, 5,000, 10,000, 20,000, 50,000, or 100,000 seconds.

In some embodiments, the device that generates heat is one of a microprocessor, a server, an electronic storage medium, an air conditioner, a refrigerator, a power supply, a radiator, a furnace, a reaction chamber, or a generator.

In some embodiments, one or more of the embodiments provided herein can be used as a renewable, lightweight, high-efficiency power generating system for the transmission of heat and/or energy in an electrical device, such as an electrical car.

While there are a variety of ways of producing the coated particles, in some embodiments, by heating a silica-encapsulated iron particle in a stream of gas containing a hydrocarbon at a temperature between 500° C. and 800° C., the carbon is precipitated in the silica layers, and the silica layers are endowed with electric conductivity. Any hydrocarbon can be used. In some embodiments, the hydrocarbon is a gas at room temperature. In some embodiments the hydrocarbon has one to three carbons. In addition, the precipitation efficiency can be increased by mixing a small amount of hydrogen. Via the above procedure, a conductive silica-encapsulated metal particle can be prepared.

In some embodiments, the gases for oxidation and/or reduction need not be concentrated or enriched from atmospheric conditions. For example, in some embodiments, conductive silica-coated metal particles can accumulate and emit heat through the following process. When the conductive silica-coated metal particles contact air, oxygen contacts the metal cores via the micropores, causing oxidation of the metal cores, and this reaction generates heat. The heat release rate can be controlled by the thickness of the silica layer and the diameter of the micropores. Once the exothermic reaction ends, heat can be accumulated by reducing the metal cores (endothermic reaction) and heat can be generated again. As the reduction method, hydrogen gas and a reduction reagent can be used; however, other methods, such as electro-reduction, can be selected. Since the particles are conductive, when a negative potential of several volts is applied through an electrode, the negative potential reaches the metal cores; therefore, the reduction of the metal cores progresses. That is, the metal component in the particles can be reduced by AC or DC power, and heat can be accumulated. This provides a system in which heat accumulation and generation can be repeated.

Typically, when oxidation and reduction (exothermic reaction and endothermic reaction) of metal particles are repeated, the metal particles grow, significantly reducing the rate of oxidation and reduction. In some situations, the rate can be reduced to an extent that the particles can no longer be used as an exothermic and endothermic material. In other words, repeated use of metal particles as heat accumulators can be difficult. In some embodiments herein, the growth of the metal particles is physically limited by the coating layer (for example, silica), and thus, the metal particles do not grow (or grow as much) even when they are repeatedly oxidized and reduced. Thus, some embodiments provide a heat accumulating material whose performance level does not decrease as much as an uncoated arrangement, even when oxidation and reduction are repeatedly performed.

In some embodiments, the coating can be optional and can be removed, for example, by including an additive to isolate the metal particles. However, in some embodiments herein, since the metal particles are isolated by an extremely thin silica layer having a thickness of several nanometers, the volume fraction of the silica (or other coating material) in the collection is kept at 1% or less. Thus, in some embodiments, metal particles can be completely prevented (or reduced) from contacting each other without reducing the amount of heat absorbed and generated per unit volume.

In some embodiments, since the core particles are coated with conductive silica layers, a voltage can be easily applied to the core particles. That is, the oxidized metal core (after the exothermic process) can be reduced (heat accumulation) using a power source. Thus, in some embodiments, metal core separation and conductivity are both achieved.

EXAMPLES

Example 1

Silica Coated Metal Particles

The particle has an outer diameter of about 110 nanometers. The particle includes a core that contains about 90% magnesium by weight of the core. The core has a diameter of about 100 nanometers. The core is coated by a layer of amorphous silica that is about 5 nanometers thick, and has a substantially uniform thickness, so that when the thickness is measured at 50 dispersed points, the standard deviation of the thickness is no more than about 20% of the average thickness. About 1% of the surface area of the coating includes pores that pass through the silica coating to the metal core. The pores have an average diameter of about 0.3 nanometers. The pores permit molecular oxygen to contact the metal core. The silica coating includes precipitated carbon, and thus is electrically conductive.

Example 2

Method of Making a Silica-Coated Metal Particle

Iron oxide is precipitated from a colloid solution, thus providing a metal core with a diameter of about 1000 nanometers. The core is dispersed in a solution. Tetramethyl orthosilicate is hydrolyzed in the solution, thus forming a silica layer over the core. The hydrolysis of Tetramethyl orthosilicate continues until the silica layer is about 10 nanometers thick. The silica-coated core is removed from solution, and dried for 24 hours under ambient conditions. The silica-coated core is baked in a stream of gas that includes hydrogen and propane at about 650° C. for about 45 minutes. The baking precipitates the propane in the silica coat, thus resulting in a coating that is electrical conductive. The silica-coated core has pores that pass through the silica coating to the iron core. At least 10% of the surface area of the coating includes pores. The pores have an average diameter of about 2 nanometers. The silica-coated metal particle has a diameter of about 1020 nanometers.

Example 3

Method of Transmitting Power

A silica-coated metal particle is provided. The particle has a metal core with a diameter of about 500 nanometers, coated by silica having a depth of about 5 nanometers. The coating includes pores on about 2% of the surface of the coating. The pores pass through the silica coating to the metal core. Each pore has a diameter of about 1 nanometer.

The particle is reduced by contacting the particle with hydrogen gas in a first location. The reduction is an endothermic reaction that accumulates heat from a heat source and transfers it to the particle. The heat source is a motor.

The particle is then moved to a second location, where the particle is oxidized by contacting the particle with oxygen. The oxidation is an exothermic reaction that releases heat at the second location. A heat-conductive filament is positioned about 5 millimeters from the second location, and accumulates about 1 millijoule of heat from the exothermic reaction. The filament conducts heat to a radiator, which emits the heat in the passenger compartment of an electric car.

Example 4

Exemplary Device for Transmitting Power

The device includes two chambers. The first chamber is an enclosed cylindrical reduction chamber with a volume of about 1000 cubic centimeters. The second chamber is an enclosed cylindrical oxidation chamber with a volume of about 1000 cubic centimeters. About 100,000 silica-coated metal particles are loaded into the first chamber. The particles have an average diameter of about 50 nanometers. The particles include an iron core and a silica coating with a thickness of about 5 nanometers. The pores cover about 2% of the surface of the coating and pass completely through the silica coating to the iron core. The silica coating contains a mixture of precipitated one-, two-, and three-carbon hydrocarbons, and thus is electrically conductive.

In the first chamber, an electrode is placed in contact with the silica coatings of some of the particles, and a potential of about 0.5 volts is applied. Since the coatings of the particles in the chamber are substantially in contact, the potential is applied to the particles throughout the chamber. About 80% of the particles are thereby at least partially reduced. The reduction reaction provides heat to the particles.

Once reduced, 95% of the particles are pumped via a tube from the first chamber to the second chamber. In the second chamber, oxygen is supplied via a showerhead injector. The oxygen contacts the particles in the second chamber, oxidizing at least 80% of the particles, thereby providing heat from the particles. The second chamber contains heat-conductive bundles of carbon nanotubes that are connected to a radiator outside of the device. The carbon nanotubes conduct at least some of the heat to the radiator.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of transmitting power, the method comprising:
   providing a silica-coated metal particle comprising:
     a metal core;
     a coating over the metal core, wherein the coating comprises:
       silica; and
       at least one pore that passes through the coating to the metal core, wherein the at least one pore is configured to allow an oxidizing agent to contact the metal core, and wherein a volume fraction of the coating to the silica-coated metal particle is in a range of about 0.1% to about 1%;
   reducing the metal core, thereby accumulating heat; and
   oxidizing the metal core, thereby generating heat.

2. The method of claim 1, wherein the silica-coated metal particle is oxidized at a first location, moved to a second location, and reduced at the second location, thereby accumulating heat from the second location.

3. The method of claim 1, wherein the silica-coated metal particle is reduced at a first location, moved to a second location, and oxidized at the second location thereby providing heat at the second location.

4. The method of claim 1, wherein thy: oxidizing comprises contacting silica-coated metal particle with oxygen.

5. The method of claim 1, wherein the reducing comprises contacting the silica-coated metal particle with one of hydrogen gas or a reduction reagent.

6. The method of claim 1, wherein the reducing comprises providing an electrode to apply a negative potential of about 0.5 to about 20 volts to the silica-coated metal particle.

7. The method of claim 1, wherein the method is performed inside a power source of a vehicle.

8. The method of claim 1, wherein the method is repeated on the same silica-coated metal particle, and wherein a diameter of the silica-coated metal particle remains substantially constant after repeated use.

9. A power transmission device comprising:
   at least one silica-coated metal particle comprising:
     a metal core; and
     a coating over the metal core, wherein the coating comprises:
       silica; and
       at least one pore that passes through the coating, to the metal core, wherein the at least one pore is configured to allow an oxidizing agent to contact the metal core, and wherein a volume fraction of the coating to the silica-coated metal particle is in a range of about 0.1% to about 1%;
   a first chamber configured to allow reduction of the silica-coated metal particle;
   a second chamber configured to al low oxidation of the silica-coated metal particle;
   a passage fluidly connecting the first chamber to the second chamber, wherein the passage is configured to allow the at least one silica-coated metal particle to flow from the first chamber to the second chamber; and
   an apparatus configured to receive heat produced by oxidation of the silica-coated metal particle in the second chamber.

10. The power transmission device of claim 9, wherein the second chamber is operationally connected to provide heat to a device that requires heat.

11. The power transmission device of claim 9, wherein the first chamber is configured to cool a device that generates heat.

* * * * *

UNITED STATES PATENT AND TRADEMARK OFFICE
CERTIFICATE OF CORRECTION

PATENT NO. : 10,005,944 B2
APPLICATION NO. : 13/809539
DATED : June 26, 2018
INVENTOR(S) : Kishida Page 1 of 1

It is certified that error appears in the above-identified patent and that said Letters Patent is hereby corrected as shown below:

In the Claims

In Column 18, Lines 1-2, please delete "thy: oxidizing comprises contacting silica-coated" and insert -- the oxidizing comprises contacting the silica-coated -- therefor.

In Column 18, Line 29, please delete "al low" and insert -- allow -- therefor.

Signed and Sealed this
Fifteenth Day of October, 2019

Andrei Iancu
*Director of the United States Patent and Trademark Office*